United States Patent [19]

Ito et al.

[11] Patent Number: 5,150,030
[45] Date of Patent: Sep. 22, 1992

[54] MOTOR DRIVING DEVICE

[75] Inventors: Noriaki Ito; Soichi Hiramatsu, both of Yokohama, Japan

[73] Assignee: Canon Kabushiki Kaisha, Tokyo, Japan

[21] Appl. No.: 623,593

[22] Filed: Dec. 7, 1990

[30] Foreign Application Priority Data

Dec. 8, 1989 [JP] Japan .................. 1-319718

[51] Int. Cl.$^5$ .............................................. H02P 5/34
[52] U.S. Cl. ..................................... 318/811; 318/807
[58] Field of Search ............... 318/599, 811, 798, 801, 318/803, 805, 807, 809, 799

[56] References Cited

U.S. PATENT DOCUMENTS

| | | | |
|---|---|---|---|
| 4,310,791 | 1/1982 | Akamatsu | 318/809 |
| 4,312,031 | 1/1982 | Kudor | 318/811 |
| 4,488,101 | 12/1984 | Studtmann | 318/798 |
| 4,928,050 | 5/1990 | Torisawa et al. | 318/685 |
| 4,963,808 | 10/1990 | Torisawa et al. | 318/696 |
| 5,029,264 | 7/1991 | Ito et al. | 318/685 |

FOREIGN PATENT DOCUMENTS 62-193548 8/1987 Japan .
62-193549 8/1987 Japan .

Primary Examiner—William M. Shoop, Jr.
Assistant Examiner—John W. Cabeca
Attorney, Agent, or Firm—Fitzpatrick, Cella, Harper & Scinto

[57] ABSTRACT

A motor driving device for a motor having a rotor and a plurality of excitation coils includes a detector for detecting a rotation position of the rotor, a controller for performing closed-loop control of the switching timing for excitation currents applied to the excitation coils according to detection signals from the detector, and drive control circuits for controlling the current supplied to the excitation coils in accordance with an output from the controller. The drive control means includes a plurality of pulse-width modulation signal generators for controlling current passing through the excitation coils.

11 Claims, 13 Drawing Sheets

MOTOR DRIVING DEVICE

BACKGROUND OF THE INVENTION

1. Field of the Invention

This invention relates to a motor driving device for driving and controlling a brushless motor, such as a stepping motor or the like, used as a driving source for an OA (office automation) apparatus or the like.

2. Description of the Prior Art

In a brushless motor, generally, for example Hall elements have been used for detecting positions of magnetic poles of a rotor to perform electric control, and an optical or magnetic encoder has been used for detecting the speed of the rotor.

However, such conventional brushless motor has the following disadvanges:

(1) It is required that magnetic poles of a stator are correctly positioned with respect to the Hall elements; and (2) Since the positions of the Hall elements and the stator are determined unconditionally when the current switching is effected by the Hall elements, a method for supplying current to the motor is limited to only one way. For example, since in case of a so-called 180° electric control, the positions of the Hall elements regarding the magnetic poles of the stator differ by 45° electrically from those in the case of a so-called 90° electric control, if two kinds of electric controls are effected by a single motor, the number of the Hall elements will be increased twice and all of the Hall elements must be arranged in positions suitable for performing the respective electric controls.

Incidentally, Japanese Patent Laid-Open Nos. 62-193548 (1987) and 62-193549 (1987) disclosed a stepping motor wherein an electric control is effected by utilizing an encoder output. However, these Patent Applications merely disclose the structure of the stepping motor itself including the encoder in a predetermined position, but do not disclose or teach the control circuit or method for driving the stepping motor.

Now, the assignee of the present application has proposed, in U.S. Ser. No. 259,259 filed on Oct. 18, 1988, a control apparatus for a stepping motor wherein an encoder having portions to be detected the number of which is an integer multiple of that of the magnetic poles of the rotor is fixedly mounted on a shaft of the rotor. When the rotor is rotated, the number of the portions to be detected on the encoder passing through a predetermined position situated at the stator side is counted so that when the counted number coincides with a predetermined value the current supply to the coils of the stator is switched. Conventionally, the drive control for the stepping motor has been performed by merely performing an open-loop control of the number of driving pulses of the stepping motor and the frequency of the pulses.

However, if the stepping motor is used as the carriage driving motor and the stepping motor is driven by the open-loop control, during the movement of the carriage, discordant noise is generated due to the vibration of the rotor of the stepping motor, particularly, the hybrid stepping motor. Further, upon start, stop and reverse of the carriage, and accordingly, upon start, stop and reverse of the stepping motor, since the stepping motor is started or stopped with vibration, large noise is also generated. These noises must be avoided, particularly in an ink jet printer such as a bubble jet printer which generates no substantial noise.

Now, the assignee of the present application has proposed, in U.S. Ser. No. 302,196 filed on Jan. 27, 1989, a recording apparatus, using the stepping motor as a driving source for shifting a recording head to scan for a recording operation, which comprises detection means for detecting the position of the rotation angle of the rotor of the stepping motor, and control means for performing a closed-loop control of the drive of the stepping motor in accordance with the result of detection by the detection means.

However, in order to perform a closed-loop control of the stepping motor, it is necessary to provide an encoder for detecting the position of the rotation angle of the rotor and it is also necessary to register the positions of the magnetic poles of the rotor with the positions of the magnetic poles (slits in the magnetic or optical system) of the encoder during assembling of the stepping motor. The reason why such registration of positions between the magnetic poles of the rotor and those of the encoder is required is that the the phase switching of the stepping motor must be synchronous with the output pulses of the encoder. If such positional registration is not obtained with high accuracy, the motor will not be rotated or will have different rotational speeds in opposite directions.

On the other hand, if the number of pulses generated during one revolution of the encoder is increased to improve the resolving power for each pulse, such positional registration will not be required. For example, in a PM stepping motor in which one revolution is achieved by 48 steps, the number of the magnetic poles of the rotor is 24 (twenty-four). In this case, if the number of the output pulses of the encoder is 288 for each revolution, the output having 12 (twelve) pulses can be obtained for each magnetic pole of the rotor. If the encoder is fixedly mounted on the shaft of the rotor at random, since the deviation between the center of the magnetic poles of the rotor and the center of the magnetic poles of the encoder corresponds to a half of a distance of two adjacent pulses at the most, such deviation will be included in the range of ±4.2%. In this case, the deviation in the switching timing of the exciting current can be negligible.

However, in this case, it must be determined which magnetic pole of the encoder corresponds to the particular magnetic pole of the rotor. To this end, first of all, the current is supplied to the coils of the motor for a predetermined time or more. Then, when the rotor of the motor is slightly rotated by the energization of the coils due to such current supply and then is stopped, the magnetic pole in the encoder which is registered with the magnetic pole of the rotor is selected. The other magnetic poles in the encoder may be selected at intervals of twelve pulses on the basis of the firstly selected magnetic pole.

The initialization of the encoder as mentioned above must be effected prior to the action of the stepping motor. That is to say, when such stepping motor is used as the carriage driving motor for a serial printer, it is necessary to initialize the encoder before the printer is powered on.

In order to perform such initialization, the assignee of the present application has previously proposed, in U.S. Ser. No. 413,473 filed on Sep. 27, 1989, in a recording apparatus using a stepping motor as a driving source for shifting a recording head to scan for a recording operation, a control device for the stepping motor which comprises detection means for detecting the position of the rotation angle of the rotor of the stepping motor, and control means for performing a closed-loop control of the drive of the stepping motor in accordance with the result of detection by the detection means and for driving the stepping motor and holding the rotor by controlling the current according to pulse-width modulation at the initialization processing wherein the drive of the stepping motor by the closed-loop control is started.

This device has the configuration as shown in FIG. 11. The device illustrates a case wherein a motor 1 is a driving source for a moving carriage 2 having a recording head in a printer or the like.

As the driving source for the carriage 2, a brushless motor, such as a stepping motor or the like, is generally used.

In FIG. 11, the driving device for the brushless motor comprises an encoder 4 for detecting the amount of rotation of the motor 1, a current switching circuit 8 for outputting a switching signal 16 for the excitation of the coil of the motor 1 after processing a signal 13 from the encoder 4, a motor driving circuit 10, a control circuit (MPU) for controlling the start, stop and speed of the motor 1, a PWM (pulse-width modulation) signal generator 9 for outputting a PWM signal 17 according to a speed control signal 14 from the control circuit 7, and the like.

In FIG. 11, reference number 5 represents a control unit for controlling the start, stop and speed of the motor 1, and reference numbers 11 and 12 represent a ROM and a RAM within the control unit 5, respectively.

FIGS. 13(A) and 13(B) are a partially-broken-away perspective view and a vertical cross-sectional view of a stepping motor as a kind of a brushless motor to which the present invention can be suitably applied.

In FIGS. 13(A) and 13(B), the brushless motor 1 has two exciting phases, i.e., "phase A" 2 and "phase B" 3. The motor 1 comprises a rotor shaft 43, a rotor 44 fixed to the rotor shaft 43, a magnet rotor 42 made of a permanent magnet provided at an outer circumference of the rotor 44, a coil 45A and a stator 46A for phase A, and a coil 45B and a stator 46B for phase B.

A rotary encoder 49 is also provided which comprises a slit disk 47 mounted on the lower end of the rotor shaft 43, and a photo-interrupter 48 fixed to the motor case receiving the slit disk 47.

The rotary encoder 49, which corresponds to the encoder 4 in FIG. 11, outputs slit detection signals (rotation-amount signals) in accordance with the rotation of the rotor.

When the exciting current for the coils 45A and 45B is switched with a predetermined timing to change the generated magnetic fields, the magnetic flux crossing the permanent magnet 42 changes to rotatably drive the rotor 44.

By counting the pulse signals (slit detection signals) 13 from the encoder 4 by the current switching circuit 8 and exciting predetermined coils 45A and 45B for every predetermined number of pulses, the rotation of the motor can be continued.

When the brushless motor 1 is mounted on an OA apparatus or the like as a power source, the control circuit 7 controls the start, stop and rotational speed of the motor 1.

The control of the rotational speed is performed, for example, by calculating the speed of the motor 1 from an interval between slit signals from the encoder 4, and changing the duty ratio (the ratio of the time during which the motor driving circuit is turned on to the total time) of the PWM signal for speed control according to an error between the calculated speed and a reference speed.

For example, if the rotational speed of the motor 1 is larger than the assinged speed, the duty ratio of the PWM signal is reduced, thus decreasing the amount of the exciting current for the motor 1 to reduce the rotational speed.

If the rotational speed of the motor 1 is smaller than the assigned speed, the duty ratio of the PWM signal is increased to increase the rotational speed of the motor 1.

However, at the driving speed of the above-described conventional brushless motor, although the rotation and the rotational speed of the motor can be controlled, there is the technical problem that control for suppressing a torque ripple caused by the brushless motor itself cannot be performed.

The torque ripple is a pulsation in the torque generated by the brushless motor, causing noise and vibration in an OA apparatus or the like.

The generation of the torque ripple will now be explained by reference to the motor 1 shown in FIGS. 13(A) and 13(B).

As described above, the brushless motor rotates according to an interaction between the magnetic field generated by the excitation of the coils and the magnetic poles on the rotor.

In the brushless motor shown in FIGS. 13(A) and 13(B), a rotational force (torque) is generated by an interaction between the magnetic teeth of the stators 46A and 46B magnetized by the magnetic fields of the coils and the rotor magnet 42 having the same number of magnetic poles as that of the magnetic teeth.

Since the usual brushless motor has a multi-layered structure having a plurality of coils, the motor is rotated with a plurality of exciting phases superposed with one another.

FIGS. 12(A)–12(C) are graphs showing the rotational forces of the brushless motor shown in FIGS. 13(A) and 13(B).

For example, the rotational force due to an interaction between the magnetic poles of the brushless motor having the two exciting phases as shown in FIGS. 13(A) and 13(B) has shape wherein mountains are superposed with one another, as shown in the graph of the exciting torque in FIG. 12(A). This is because the rotational force is generated while alternately switching the two coils 45A and 45B.

In addition to the above-described exciting torque, however, the brushless motor has a pulsation in the torque named a detent torque, as shown in FIG. 12(B).

The detent torque, which represents variations in load produced when the motor 1 is rotated around the rotor shaft 43 in an open state (in a non-excitation state), is generated due to an interaction between the magnetic poles of the rotor and the magnetic teeth of the stator.

While the interaction between the magnetic fields generated by exciting the coils 45A and 45B consists of attraction and repulsion, the detent torque consists only of attraction.

Consequently, the pulsation in the torque generated in the brushless motor is a result of adding (superposing)

the two interactions shown in FIGS. 12(A) and 12(B), and has the shape including a distortion as shown in FIG. 12(C).

Microscopically, the rotational speed of the motor also repeats variations in the speed similar to the above-described distortion.

Since the frequency of the variations in the rotational speed is too high at the usual rotational speed of the motor, it is impossible to remove the variations merely by the control by the control circuit.

SUMMARY OF THE INVENTION

It is the object of the present invention to solve the above-described problems.

It is another object of the present invention to provide a high-performance brushless motor generating low levels of vibration and noise, having a simple configuration.

These and other objects of the present invention are achieved, according to one aspect of the invention, by a motor driving device having detection means for detecting a rotation position of a rotor of a motor and for producing detection signals, control means for performing closed-loop control of the switching timing for an excitation current supplied to the excitation coils according to detection signals from the detection means, and a plurality of drive control means for controlling the current supplied to the excitation coils in accordance with an output from the control means. The plurality of drive control means comprise a plurality of pulse-width modulation signal generators for controlling current passing through the excitation coils.

Each of the pulse-width modulation signal generators may, for example, control the current passing through a different one of the excitation coils. The control means outputs different pulse-width modulation command signals to the several pulse-width modulation signal generators. The control means and the plurality of drive control means together may serve to compensate for the detent torque of the motor. The control means can output a pulse-width modulation command signal to one of the pulse-width modulation signal generators of such a value that the torque generated by an excitation coil whose excitation current is controlled by a given one of the plurality of drive control means is substantially equal to the value of the detent torque of the motor. One of the plurality of drive control means controls an excitation current applied to the excitation coil which increases the speed of the motor when the control means performs constant speed control of the motor.

According to another aspect of the present invention, a motor driving device comprises detection means for detecting a rotation position of a rotor of a motor and for producing detection signals, control means for performing closed-loop control of the switching timing for excitation current applied to the excitation coils according to detection signals from the detection means, a plurality of drive control means for controlling current supplied to the excitation coils in accordance with an output from the control means, and a pulse-width modulation signal generator circuit connecting the plurality of drive control means and the control means, for controlling current passing through the excitation coils.

Each of the plurality of drive control means comprises a resistor connected in series to an output terminal of its respective drive control means. The several drive control means output motor driving voltages different from one another, and can comprise means for compensating for a detent torque of the motor. In addition, according to one embodiment, only one of the plurality of drive control means comprises a resistor connected in series with an output terminal of one of the plurality of drive control means. In addition, the plurality of drive control means can comprise means for outputting different motor driving voltages to different excitation coils. The pulse-width modulation generation circuit can apply the same pulse-width modulation signal to the plurality of drive control means and each of the drive control means can comprise mans for applying a voltage to an element thereof such that the drive control means output different motor driving voltages to different ones of the excitation coils. In addition, the apparatus can further comprise a plurality of means for applying voltages to elements of the plurality of driving control means and a plurality of switches for connecting the plurality of voltage applying means to the plurality of drive control means. Each of the plurality of drive control means may comprise a resistor, adapted to be connected in series to an output terminal thereof, and a switch connecting and disconnecting the resistor to the output terminal.

These and other objects, features and advantages of the present invention will become more apparent from the following detailed description of the preferred embodiments taken in conjunction with the attached drawings.

DETAILED DESCRIPTION OF THE PREFERRED EMBODIMENTS

The present invention will now be explained in detail by reference to FIGS. 1 through 10.

Figure 13A:
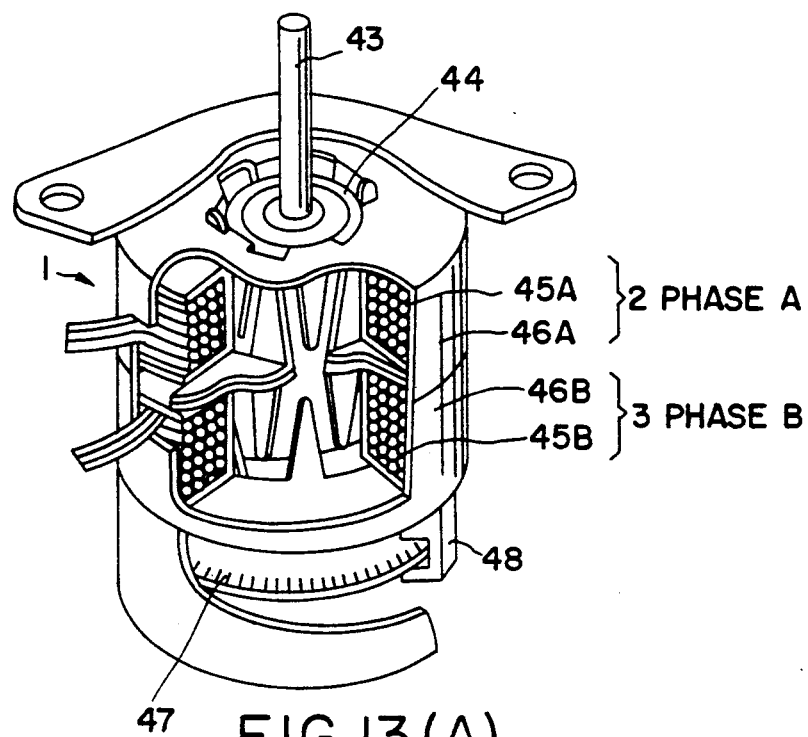
FIGS. 13(A) and 13(B) are a partially-broken-away perspective view and a schematic vertical cross-sectional view showing the structure of a stepping motor as a kind of a brushless motor, respectively.
Figure 13B:
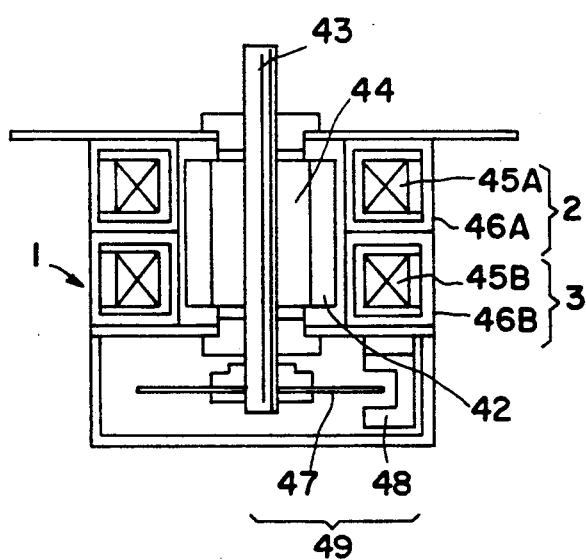

Also in FIGS. 1-10, the brushless motor shown in FIG. 13 will be cited as a particular example of the structure of the motor to which the present invention is applied.

Figure 1:
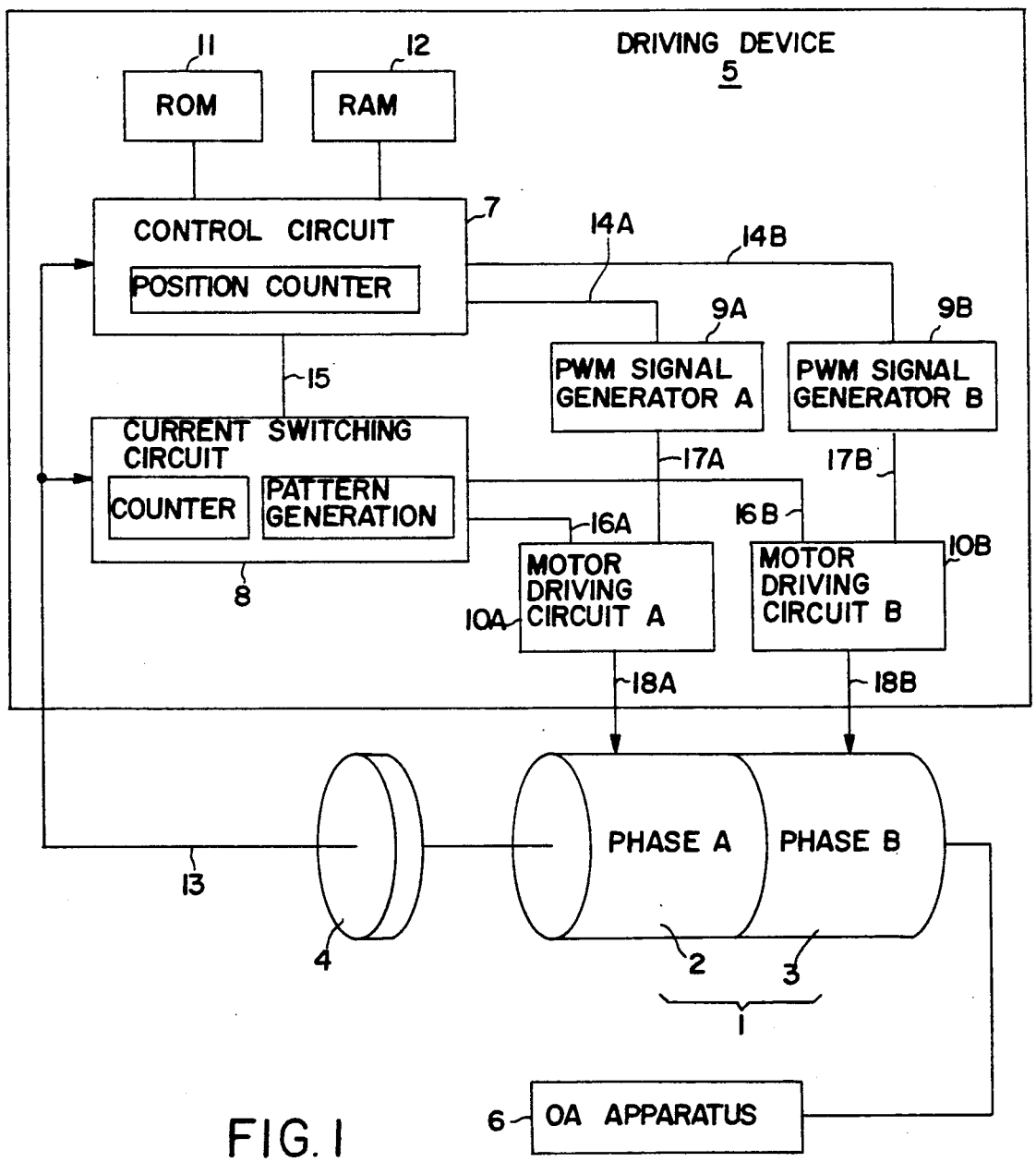
FIG. 1 is a block diagram showing the configuration of a driving device for a brushless motor according to a first embodiment of the present invention.

FIG. 1 is a block diagram showing the configuration of a driving device for a brushless motor according a first embodiment of the present invention.

In the FIG. 1 embodiment, a brushless motor 1 is driven as a driving source for an OA apparatus 6. The brushless motor 1 has two exciting phases. i.e., "phase A" 2 and "phase B" 3.

In FIG. 1, the amount of rotation of the brushless motor 1 is detected by an encoder 4 identical to the rotary encoder 49 shown in FIG. 13. Pulse signals (detection signals) 13 from the encoder 4 are input to a control circuit 7 and a current switching circuit 8.

In the present (first) embodiment, a plurality of motor driving circuits and PWM (pulse-width modulation) signal generators are provided corresponding to a plurality of exciting coils, that is, in the case of FIG. 1, two motor driving circuits 10A and 10B and two PWM signal generators 9A and 9B corresponding to exciting coils 45A and 45B, respectively.

Switching signals 16A and 16B are output from the current switching circuit 8 to the motor driving circuits 10A and 10B, respectively.

PWM command signals 14A and 14B are output from the control circuit 7 to the PWM signal generators 9A and 9B, respectively. PWM signals 17A and 17B are output from the PWM signal generators 9A and 9B to the motor driving circuits 10A and 10B, respectively.

A control signal 15 for the start, stop, rotation or the like of the motor 1 is output from the control circuit 7 to the current switching circuit 8.

Predetermined amounts of driving currents 18A and 18B are supplied from the motor driving circuits 10A and 10B to the corresponding exciting phases A and B with a predetermined timing, respectively.

In FIG. 1, reference number 5 represents the driving device for the brushless motor configured according to the present invention, and reference numbers 11 and 12 represent a ROM and a RAM connected to the control circuit 7.

The brushless motor 1 shown in FIG. 1 has substantially the same structure as that of the brushless motor shown in FIG. 13.

The operation of the brushless motor 1 shown in FIG. 1 will now be explained.

The rotation drive of the motor 1 is performed by the current switching circuit 8 and the motor driving circuits 10A and 10B.

The rotational speed of the motor 1 is controlled by the control circuit 7 and the PWM signal generators 9A and 9B via the motor driving circuits 10A and 10B.

Figure 2A:
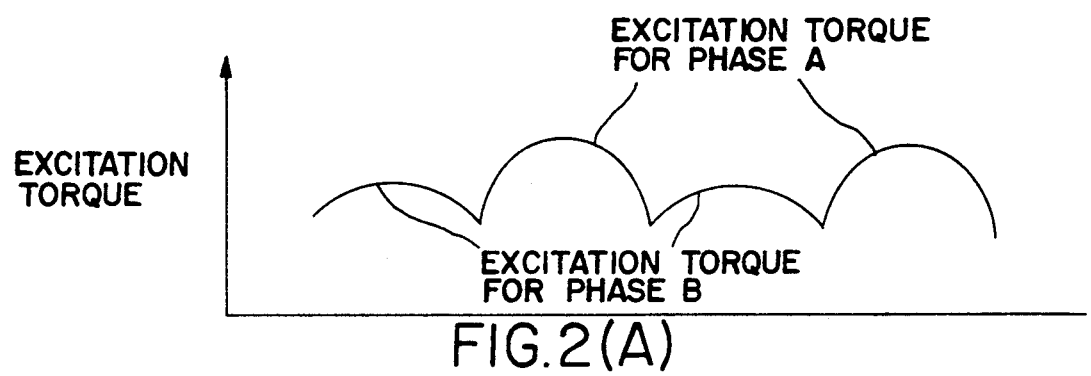
FIGS. 2(A)–2(C) are graphs showing how ripples in output torques of the motor are suppressed in the driving device shown in FIG. 1.
Figure 2B:
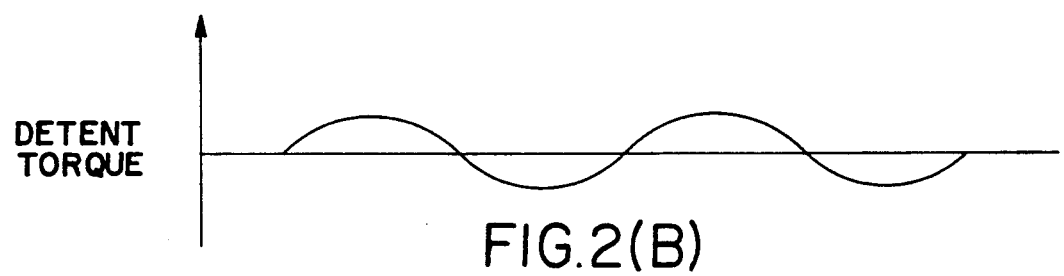
Figure 2C:
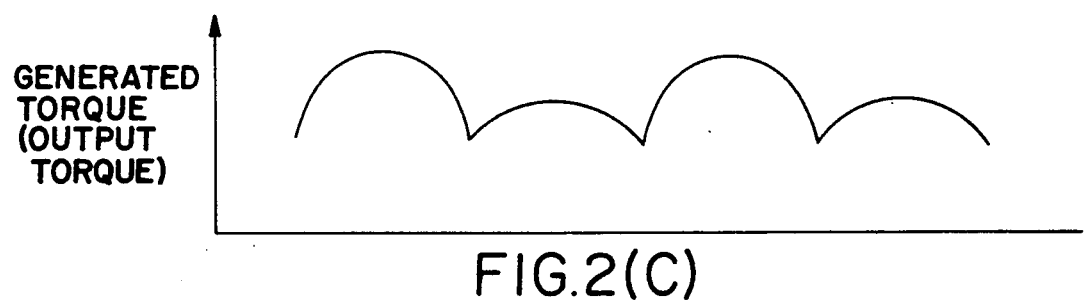

FIGS. 2(A)-2(C) are graphs showing how torque ripples of the brushless motor 1 shown in FIG. 1 are compensated: FIG. 2(A) shows an exciting torque generated by exciting the coils of the motor; FIG. 2(B) shows a detent torque peculiar to the motor; and FIG. 2(C) shows a torque generated by synthesizing the torques shown in FIGS. 2(A) and 2(B).

As can be seen from FIG. 2(C), a distortion is generated in the generated torque due to the superposition of the exciting torque and the detent torque having periods shifted from each other.

Accordingly, by properly arranging the waveform of the exciting torque shown in FIG. 2(A), it is possible to reduce the ripple in the generated torque when the exciting torque is superposed with the detent torque.

In the present (first) embodiment, by controlling the PWM signals 17A and 17B for adjusting speed by the control circuit 7, it is possible to arrange so that the motor 1 outputs a generated torque having little torque ripple.

That is, as described above, the currents passing through the coils 45A and 45B can be adjusted by the duty ratios of the PWM signals 17A and 17B. As a result, the generated torque of the motor 1 can be increased or reduced in proportion to the currents passing through the coils 45A and 45B.

Accordingly, by changing the duty ratios of the PWM signals 17A and 17B, it is possible to adjust the generated torque of the motor 1.

For example, in the brushless motor 1 having two phases shown in FIG. 13, the currents passing through the coils 45A and 45B are controlled by the PWM signal generators 9A and 9B, respectively.

The control circuit 7 outputs the PWM command signals 14A and 14B so as to control the rotational speed of the motor 1 according to speed command tables stored in the ROM 11.

That is, the PWM command signals 14A and 14B can freely control the speed of the motor 1 by being able to be set to desired values according to the speed command tables within the ROM.

If the control circuit 7 outputs the PWM command signal 14A for performing a predetermined speed control to the PWM signal generator 9A, and outputs the PWM command signal 14B provided by subtracting a predetermined value from the value the PWM command signal 14B would otherwise have when there is no compensation for the detent torque to the PWM signal generator 9B, the waveform of the exciting torque is as shown in FIG. 2(A).

The detent torque retains the waveform as shown in FIG. 2(B) since it is peculiar to the motor 1 and so does not change. Hence, the generated torque of the motor 1 as a result of the synthesis of the exciting torque shown in FIG. 2(A) and the detent torque has the shape shown in FIG. 2(C). Accordingly, it is possible to obtain an output torque having a torque ripple smaller than the conventional generated torque shown in FIG. 13(C).

The setting of the PWM command signal 14B will now be explained.

Since the detent torque of the motor is generated due to an error during assembling of the motor, and the like, it has a value peculiar to the motor and the value does not change.

Accordingly, by previously measuring the period of the detent torque and reducing the exciting current for phase B, corresponding to the coil which has a positive detent torque and increases the generated torque, by an amount to generate the nearly same amount of torque as the detent torque, the torque ripple in the generated torque (output torque) can be suppressed to a small value.

Figure 3:
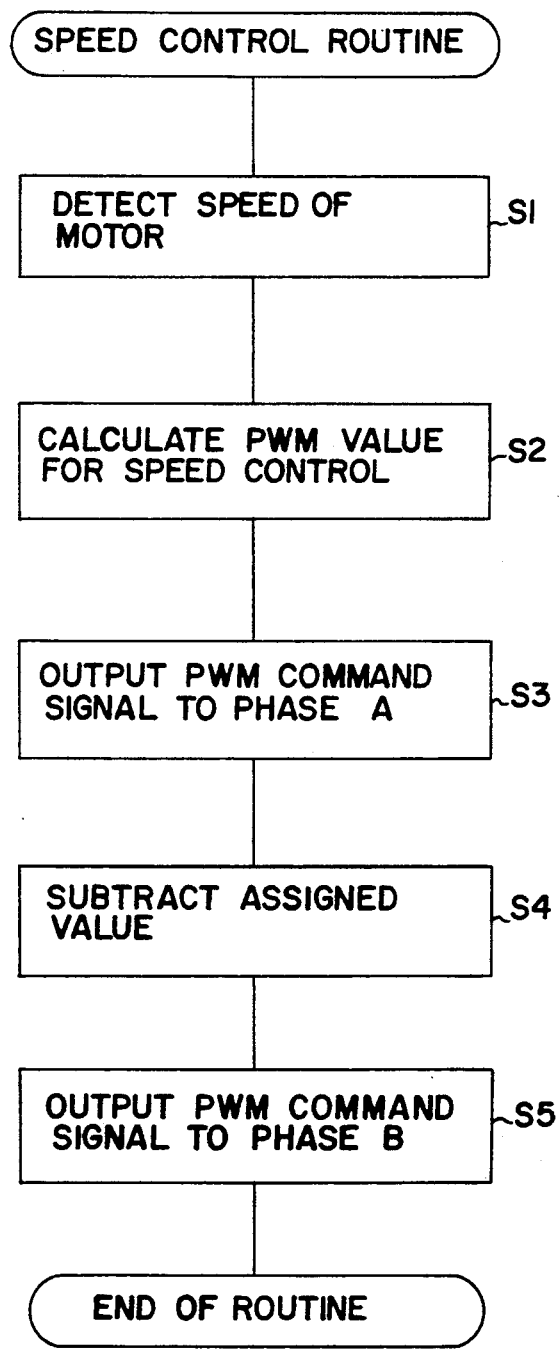
FIG. 3 is a flowchart of an operation for suppressing torque ripples in the driving device shown in FIG. 1.

FIG. 3 is a flowchart of an operation to suppress the torque ripple in a speed control routine of the control circuit 7.

That is, by generating a PWM signal corresponding to the current value of the speed of the motor 1 to generate a torque having a value equal to the detent torque using speed command tables within the ROM 11, the above-described control of the torque ripple can be performed according to the operation shown in FIG. 3.

In FIG. 3, when the process has entered the speed control routine, the rotational speed of the motor 1 is first detected at step S1. At step S2, a PWM value for speed control is calculated according to the detected rotational speed. At step S3, the PWM command signal 14A is output to phase A.

As for the PWM command signal 14B for phase B, an assigned value is subtracted from the value the PWM command signal 14B would otherwise have when there is no compensation for the detent torque by the control circuit 7 according to a preset table stored in a ROM 11 at step S4, and the PWM command signal 14B obtained as a result of the subtraction is output to phase B at step S5. The value of the PWM command signal 14B selected by this subtraction process by control circuit 7 is such that the torque generated by phase B is substnatially equal to the detent torque.

As described above, the driving device for the brushless motor according to the present invention, that is, the driving device for the brushless motor 1 having a plurality of exciting coils 2 and 3, is provided which includes a control means for individually controlling the exciting torques of the respective exciting coils 2 and 3.

In the foregoing embodiment, in order to control the currents passing through the respective exciting coils 2 and 3, the control means comprises a plurality of PWM signal generators 9A and 9B provided for the respective exciting coils 2 and 3.

The device is also configured so that the PWM command signals 14A and 14B different from each other are output from the control circuit 7 to the PWM signal generators 9A and 9B, respectively.

Although, in the foregoing embodiment, the period of the detent torque has previously been measured and a phase which reduces the exciting torque is selected, there is another method (a second embodiment) to which the present invention can be applied, wherein speed variations before correcting the torque ripple by the control means have previously been measured, the phase which increases the speed is made phase B, and the PWM command signal 14B for phase B is set to a small value.

The second embodiment has the effect that it is not necessary to previously measure the period of the detent torque for each motor.

It becomes necessary, however, to perform initialization processing wherein the motor is controlled to a constant speed when a power supply is turned on, and speed variations are detected.

Figure 4:
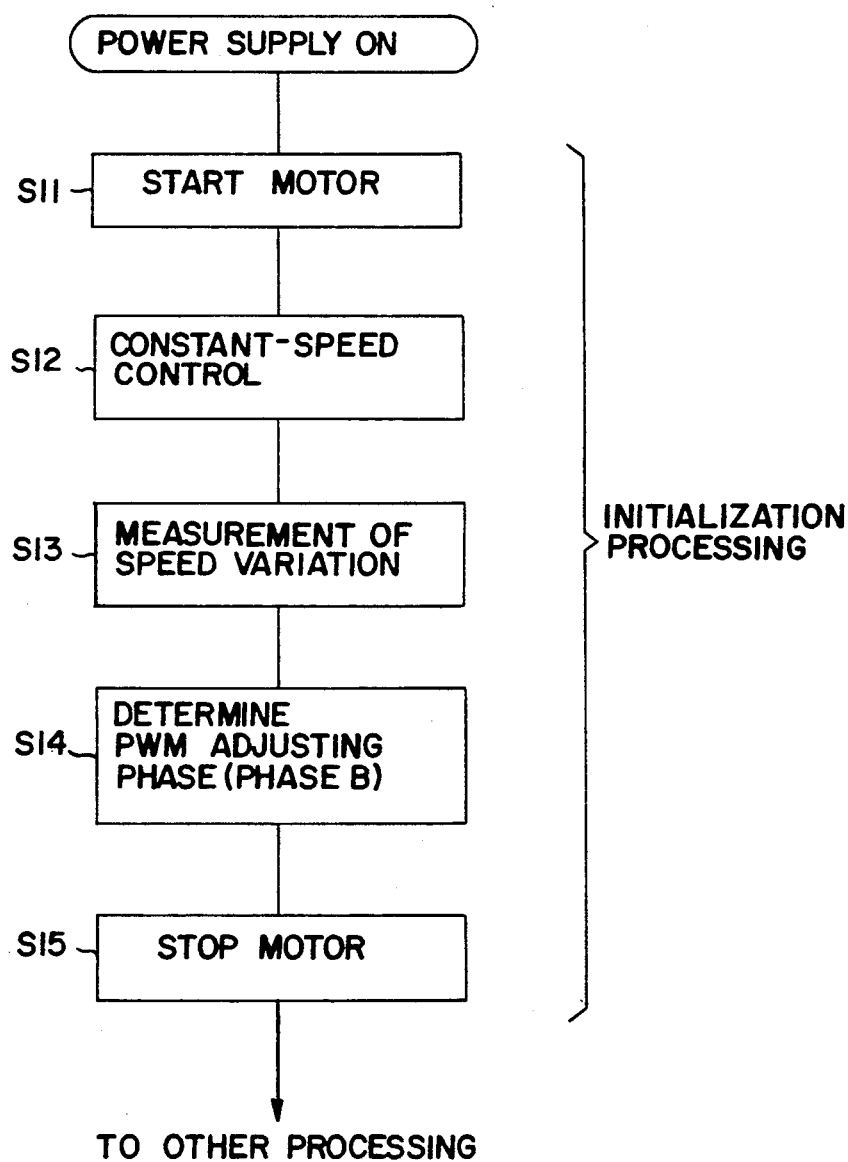
FIG. 4 is a flowchart of the operation of a second embodiment of the present invention for determining an exciting phase to be corrected in the driving device shown in FIG. 1.

FIG. 4 is a flowchart of the above-described initialization processing when the power supply is turned on.

In FIG. 4, after the power supply has been turned on, the motor 1 is started at step S11, the constant-speed control of the motor 1 is performed at step S12, and speed variations are measured at step S13.

According to the measured result of the speed variations, the phase which increases the speed is determined as phase B, that is, the phase in which the torque ripple is to be corrected, at step S14.

Subsequently, the motor 1 is stopped at step S15.

After thus determining the phase B, the correction operation of the torque ripple explained with reference to FIG. 2 is executed.

The second embodiment differs from the first embodiment in the above-described points. All the other portions of the second embodiment have the same configuration as that of the first embodiment explained with reference to FIGS. 1-3.

According to the above-described two embodiments, since the torque ripple is suppressed by individually controlling the exciting torques of the plurality of coils 2 and 3, the vibration and noise of the motor 1 can be effectively reduced with the driving devices having simple configurations, and it is possible to realize motors having high performance.

Figure 5:
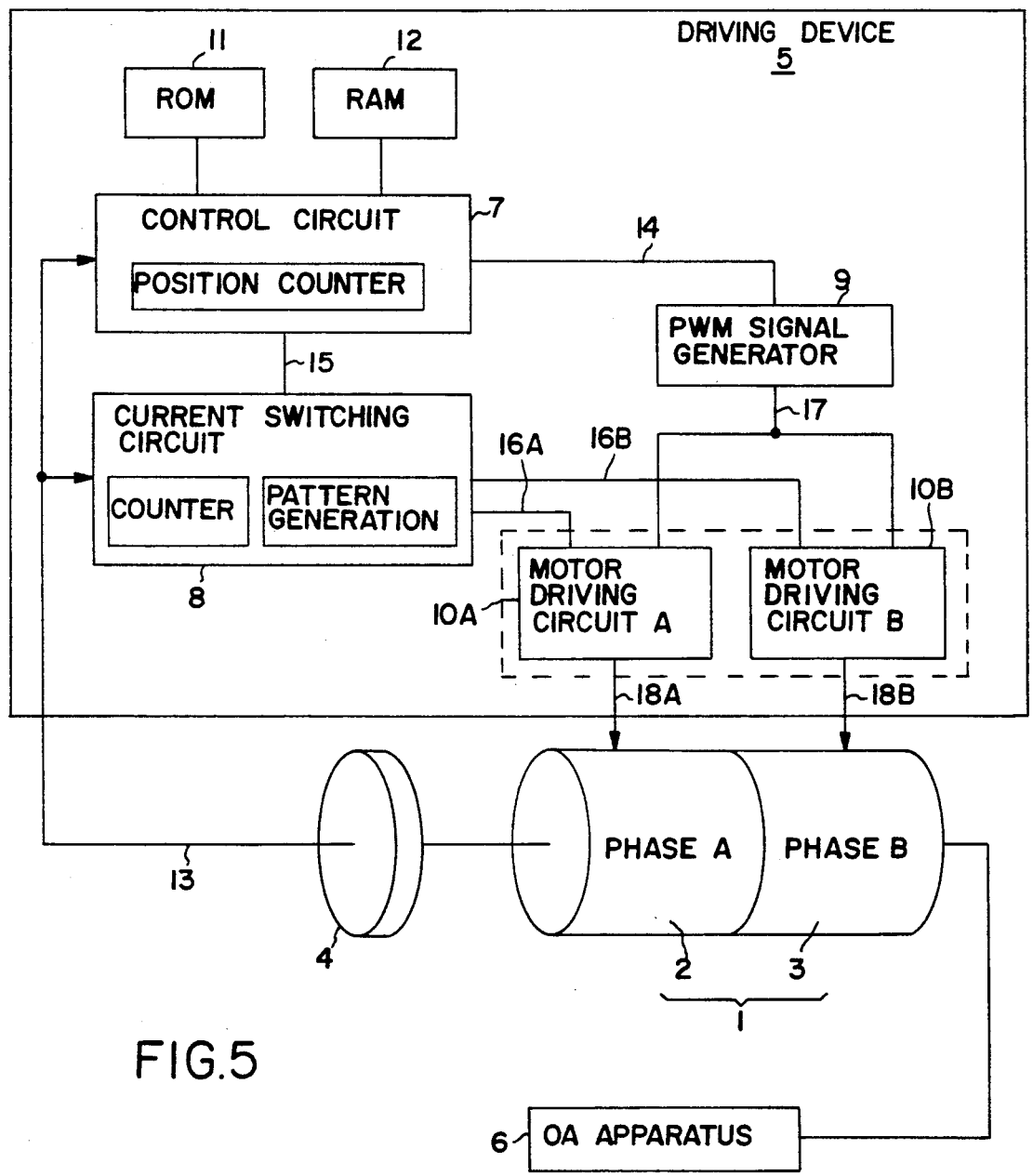
FIG. 5 is a block diagram showing the configuration of a driving device for a brushless motor according to a third embodiment of the present invention.
Figure 6:
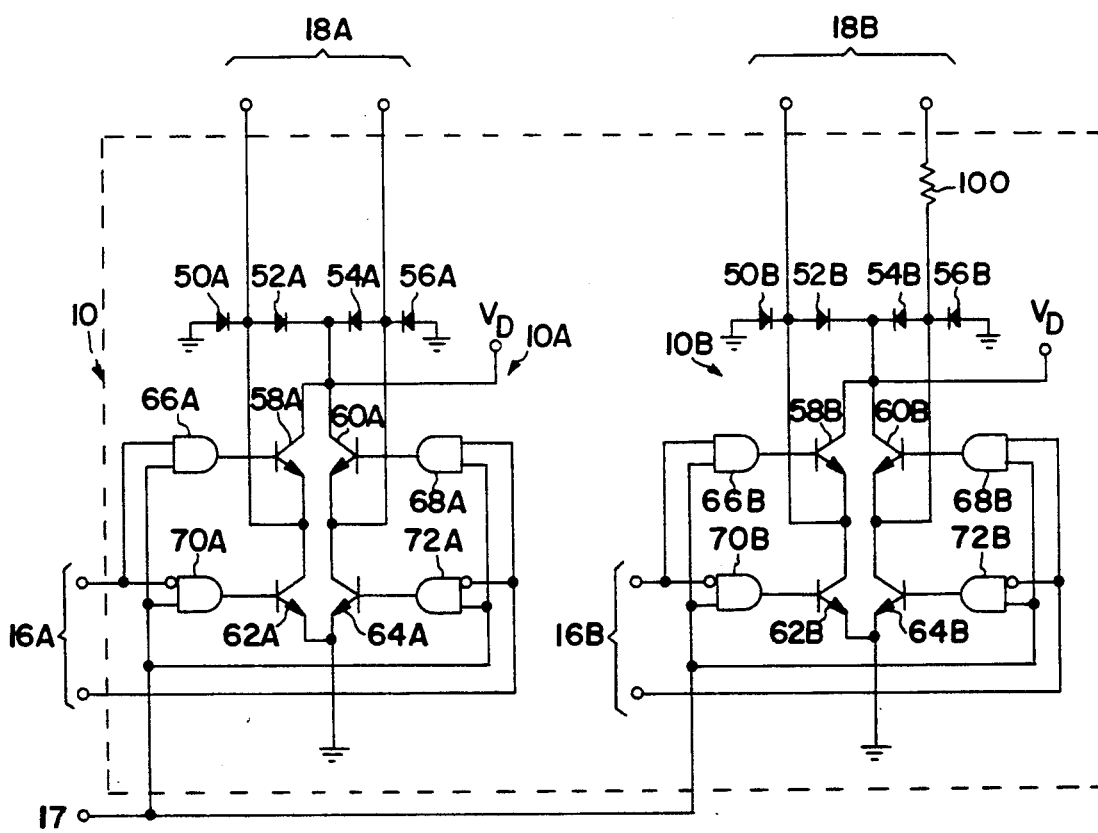
FIG. 6 is a circuit diagram of the motor driving circuit shown in FIG. 5.

FIG. 5 is a block diagram showing the configuration of a driving device for a brushless motor according to a third embodiment of the present invention. FIG. 6 is a diagram of the motor driving circuit in the driving device shown in FIG. 5.

In the present embodiment, the correction of the exciting torque of the motor 1 is performed by a resistor 100 provided in the motor driving circuit 10B.

Since the speed control by a PWM signal 17 is equivalent to a constant-voltage drive, the correction can be performed by utilizing the fact that the current values are reduced when resistors are inserted in series in the motor coils 2 and 3 to reduce the exciting torques.

This principle is applied in the present embodiment.

As shown in FIG. 6, driving circuit 10A comprises four diodes 50A, 52A, 54A, and 56A, four transistors 58A, 60A, 62A, and 64A, and four AND gate circuits 66A, 68A, 70A, and 72A. AND gate circuits 70A and 72A have one inverted input. The PWM signal 17 is inputted to gate circuits 66A, 68A, 70A, and 72A of the motor drive circuit 10A. These gate circuits 66A, 68A, 70A, and 72A are so designed that they control the motor drive currents 18A flowing through the excitation coils of the motor 1 by turning predetermined transistors 58A, 60A, 62A, and 64A ON when both a switching signal 16A of the current switching circuit 8 and the PWM signal 17 are in an enable condition "H". The reference numerals 50A and 52A, and 54A and 56A designate flywheel diodes. A voltage $V_D$ is applied to the collectors of transistors 58A and 60A. Voltage $V_D$ can be constant or variable.

Figure 8:
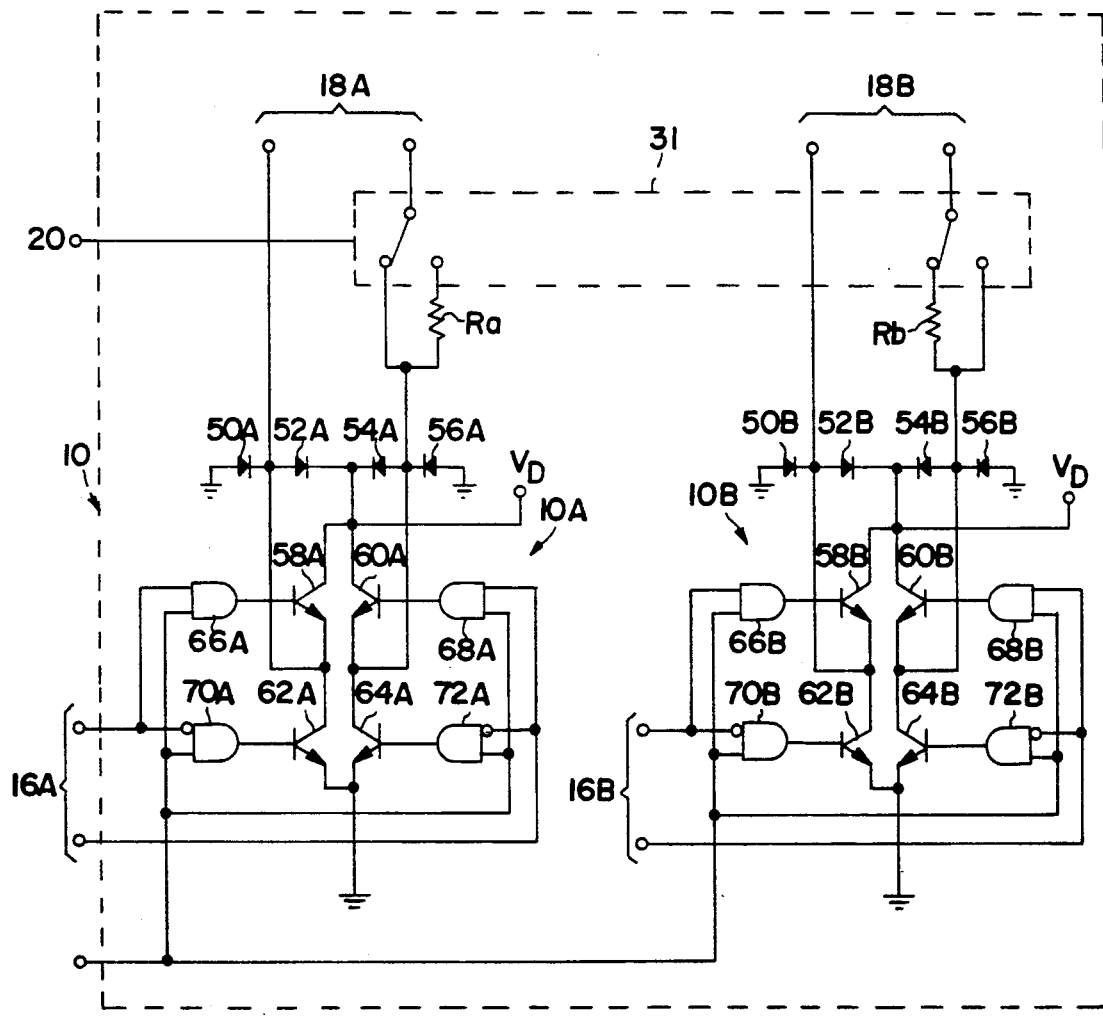
FIG. 8 is a circuit diagram of the motor driving circuit shown in FIG. 7.
Figure 9:
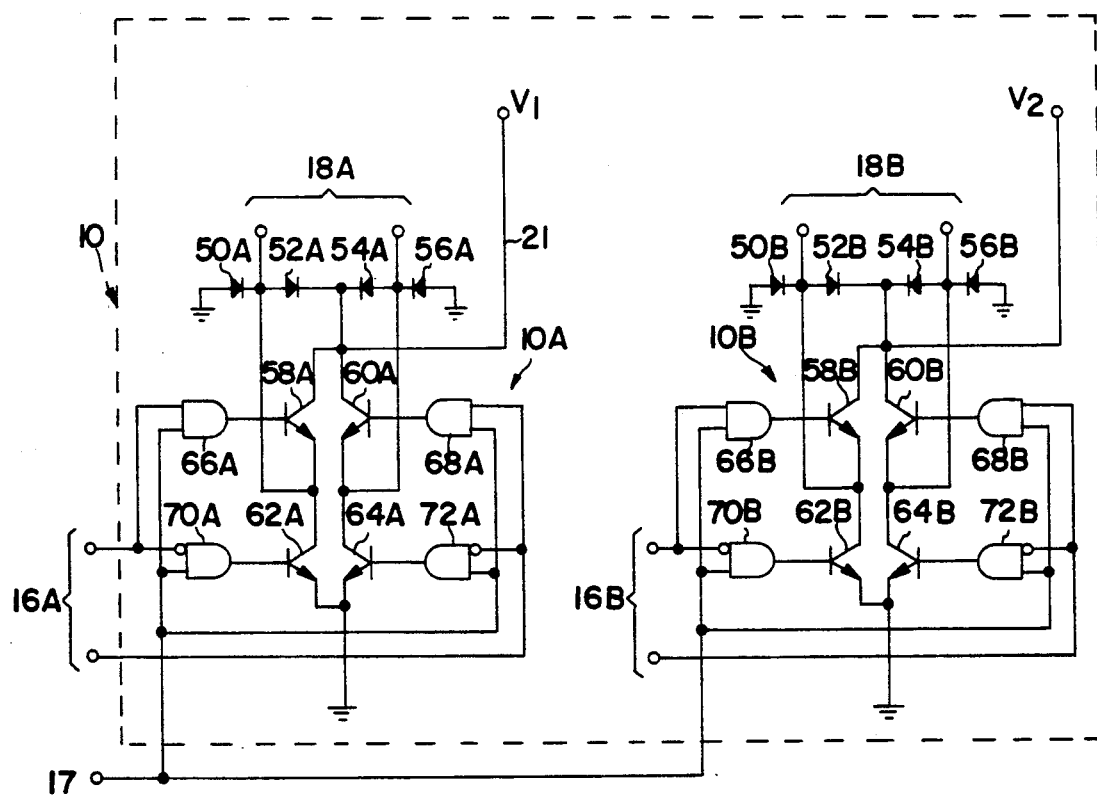
FIG. 9 is a circuit diagram of a motor driving circuit of a driving device for a brushless motor according to a fifth embodiment of the present invention.
Figure 10:
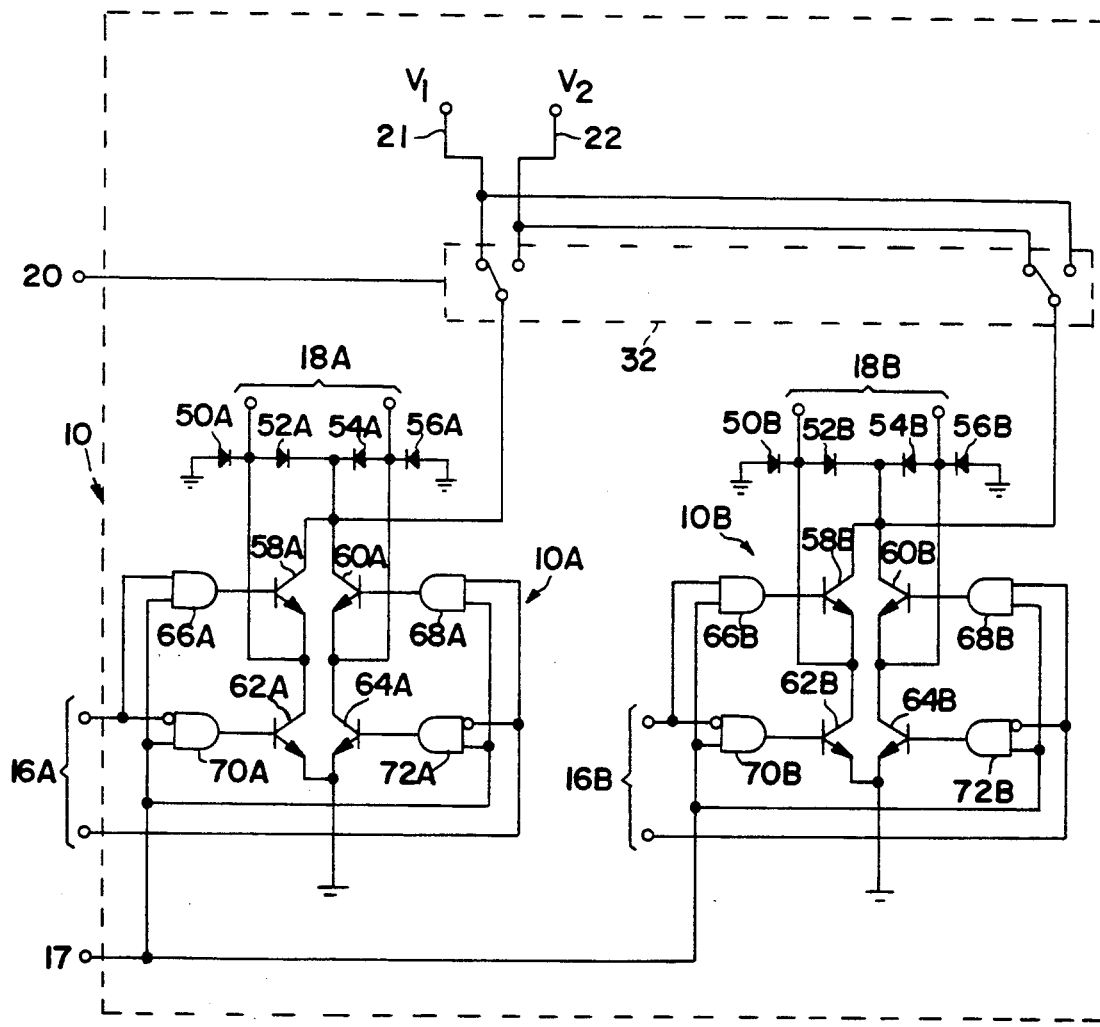
FIG. 10 is a circuit diagram of a motor driving circuit of a driving device for a brushless motor according to a sixth embodiment of the present invention.
Figure 11:
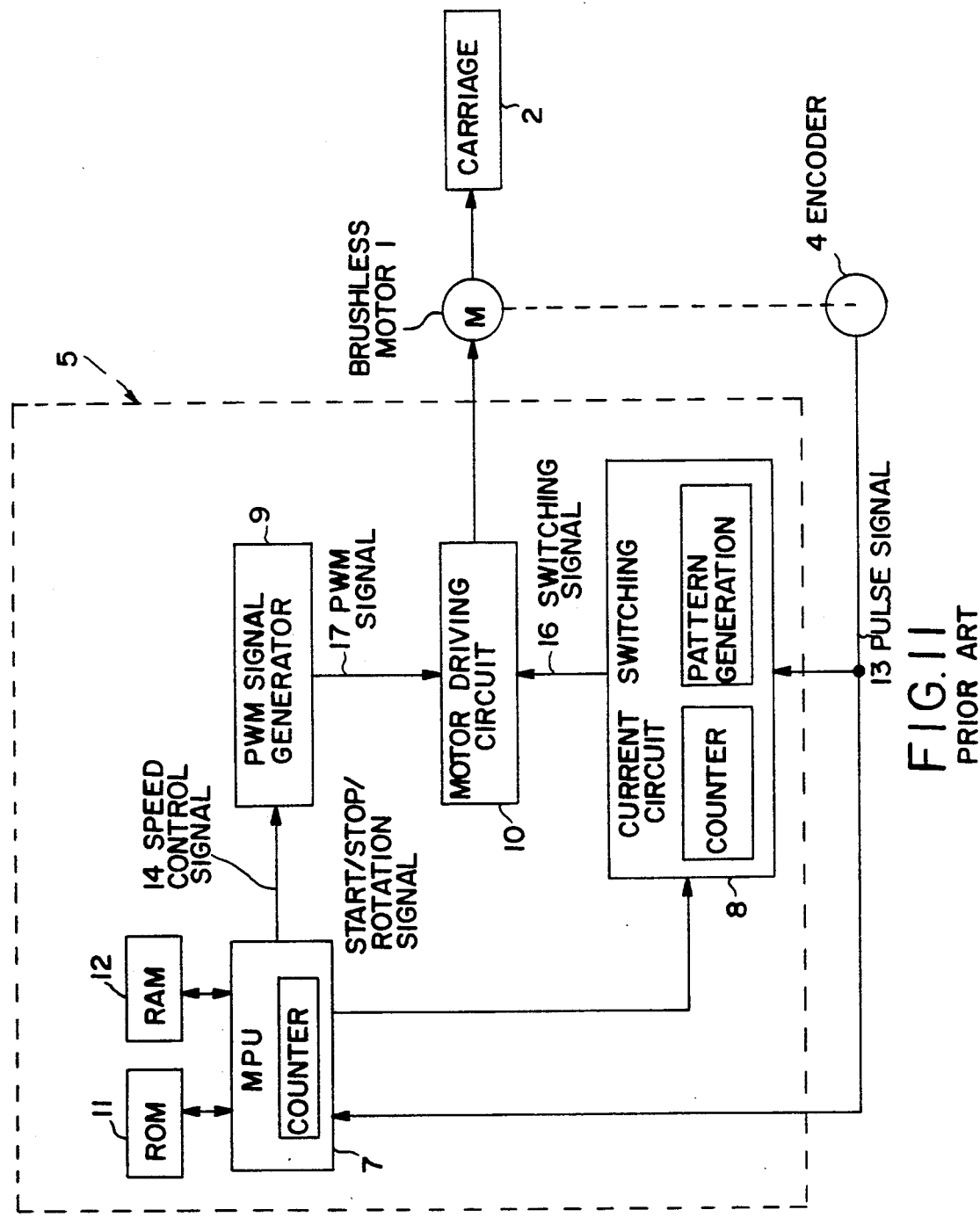
FIG. 11 is a block diagram showing the configuration of a conventional driving device for a brushless motor.
Figure 12A:
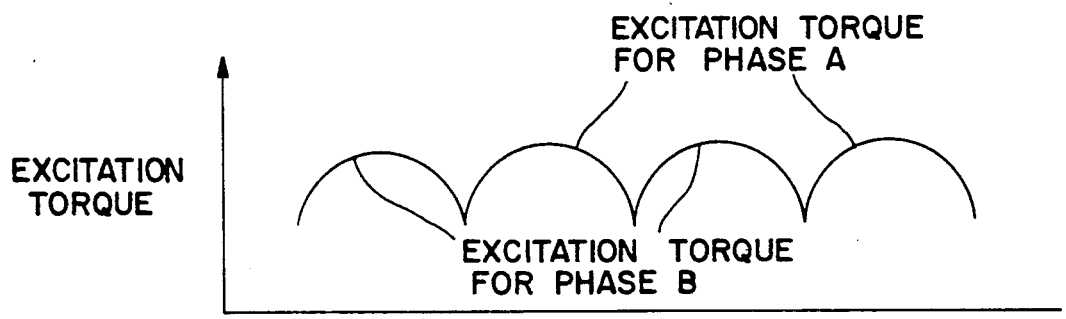
FIGS. 12(A)–12(C) are graphs showing ripples in torques generated in the conventional brushless motor shown in FIG. 11.
Figure 12B:
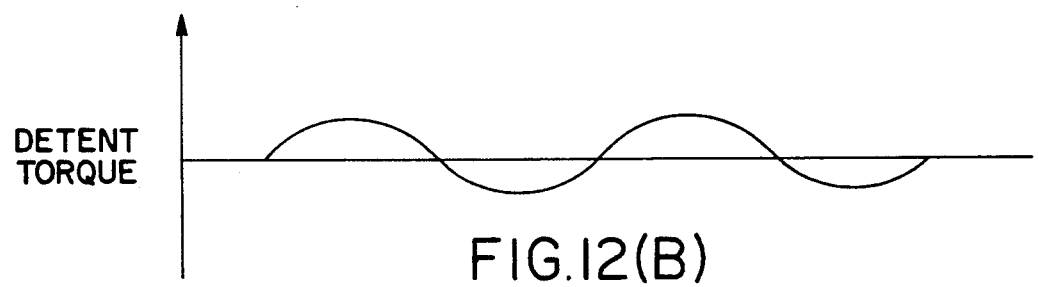
Figure 12C:
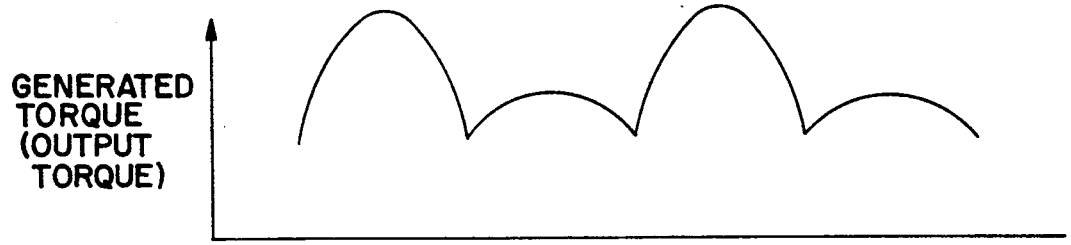

Similarly, driving circuit 10B comprises four diodes 50B, 52B, 54B, and 56B, four transistors 58B, 60B, 62B, and 64B, and four AND gate circuits 66B, 68B, 70B, and 72B. AND gate circuits 70B and 72B have one inverted input. The reference numerals 50B and 52B, and 54B and 56B designate flywheel diodes. Voltage $V_D$ is applied to the collectors of transistors 58B and 60B. Driving circuit 10B operates in the same manner as driving circuit 10A. FIGS. 8, 9, and 10 show circuits which use the same elements 50A-72A and 50B-72B shown in FIG. 6 and operate in the same manner, except as noted below.

Accordingly, if the phase to be corrected has previously known as explained in the first embodiment, by previously inserting in phase B (the phase to be corrected between a terminal of driving current 18B and a point between transistors 60B and 64B) the resistor 100 (see FIG. 6) having a value so as to be able to provide the effect to correct the detent torque of the motor 1, the torque ripple can be suppressed in the same manner as in the foregoing embodiments.

The value of the resistor 100 to be inserted may be about a few fractions of the resistance value of the coil of "phase B" 3.

The present embodiment differs from the foregoing (FIGS. 1-4) embodiments in the above-described point. The other portions of the present embodiment are configured substantially in the same manner as the foregoing embodiments. Hence, like components are indicated by like numerals, and a detailed explanation thereof will be omitted.

Accordingly, as in the foregoing embodiments, the present embodiment has the configuration wherein the torque ripple is suppressed by individually controlling the exciting coils of a plurality of coils 2 and 3. As a result, the vibration and noise of the motor 1 can be effectively reduced by a driving device having a simple configuration, and it is possible to realize a high-performance motor.

Figure 7:
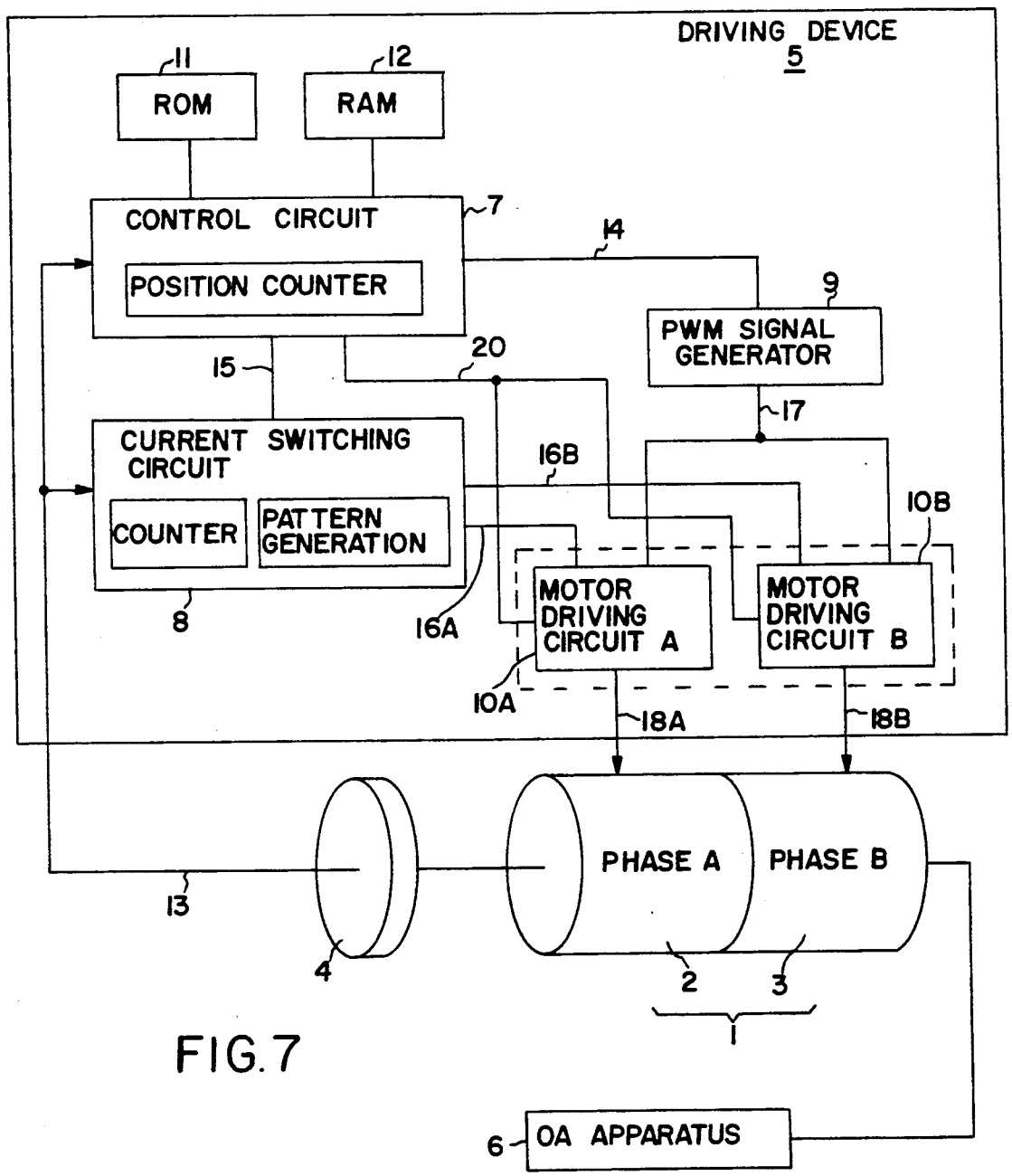
FIG. 7 is a block diagram showing the configuration of a driving device for a brushless motor according to a fourth embodiment of the present invention.

FIG. 7 is a block diagram showing the configuration of a driving device for a brushless motor according to a fourth embodiment of the present invention. FIG. 8 is a circuit diagram of the motor driving circuits 10A and 10B in the driving device shown in FIG. 7.

When in the third embodiment the phase to be corrected is not fixed to phase B but is determined according to the flowchart shown in FIG. 4, the torque ripple in the generated torque can be suppressed using the driving device shown in FIG. 7 and the motor driving circuits 10A and 10B shown in FIG. 8.

In the present embodiment, if the phase to be corrected has been determined at step S4 in the initialization processing (FIG. 4) when turning on the power supply, resistors are inserted by switching switches 31 (FIG. 8) in the motor driving circuits 10A and 10B by a switching signal 20 from the control circuit 7.

In the present embodiment, as shown in FIG. 8, the device is configured so that a resistor $R_a$ can be inserted in phase A and a resistor $R_b$ can be inserted in phase B.

Switching signal 20 controls switches 31 to selectively pass driving currents 18A and 18B through resistors $R_a$ and $R_b$, respectively, which are coupled between transistors 60A and 64A, and 60B and 64B, respectively. A voltage $V_D$ is applied to the collectors of transistors 58B, 60A, and 58B, 60B of motor driving circuits 10A and 10B. This voltage can be constant or variable.

The present (fourth) embodiment differs from the third embodiment shown in FIGS. 5 and 6 in the above-described point. The other portions of the present embodiment are configured substantially in the same manner as the third embodiment. Hence, like components are indicated by like numerals, and a detailed explanation thereof will be omitted.

Accordingly, as in the foregoing embodiments, the present embodiment has the configuration wherein the torque ripple is suppressed by individually controlling the exciting coils of a plurality of coils 2 and 3. As a result, the vibration and noise of the motor 1 can be effectively reduced by a driving device having a simple configuration, and it is possible to realize a high-performance motor.

FIG. 9 is a circuit diagram showing motor driving circuits 10A and 10B of a driving device for a brushless motor according to a fifth embodiment of the present invention.

The fifth embodiment is characterized by the features that the phase in which the exciting torque is to be corrected is previously determined and the voltage applied to the phase of the motor 1 to be corrected is different from the voltage applied to the other phase of the motor 1, to cancel the deleterious effects of the detent torque.

A driving device having the same configuration as that of the driving device shown in FIG. 5 (the third embodiment) may be used in the present embodiment.

In the present embodiment, when the values of the PWM signals for phase A and phase B are identical, the torque ripple in the generated torque is suppressed by correcting the excitation torque by applying different driving voltages to the two phases of the motor 1.

In the example shown in FIG. 9, a driving voltage $V_1$ is applied to exciting phase A from terminal 21, and a driving voltage $V_2$ is applied to exciting phase B from terminal 22.

Voltages $V_1$ and $V_2$ are respectively applied to collectors of transistors 58A, 60A and 58B, 60B. The values of voltages $V_1$ and $V_2$ are chosen to be such that the voltages exciting motor driving circuits 10A and 10B are different and such that the detent torque is compensated for.

The present embodiment differs from the third embodiment shown in FIGS. 5 and 6 in the above-described points, and the other portions are configured substantially in the same manner.

Accordingly, as in the foregoing embodiments, the present embodiment has the configuration wherein the torque ripple is suppressed by individually controlling the exciting coils of a plurality of coils 2 and 3. As a result, the vibration and noise of the motor 1 can be effectively reduced by a driving device having a simple configuration, and it is possible to realize a high-performance motor.

FIG. 10 is a block diagram showing the configuration of a driving device for a brushless motor according to a sixth embodiment of the present invention.

In the above-described FIG. 9 embodiment, the device is configured so that the voltage applied to the phase in which the exciting torque is to be corrected is different from the voltage applied to the other phase, when the phase is previously determined. In the present embodiment, however, the device is configured so that the phase to be corrected is determined by the initialization processing when the power supply for the motor is turned on.

That is, as shown in FIG. 10, by switching switches in motor driving circuits 10A and 10B to either terminal 21 or 22 by a switching signal 20, the voltages applied to phase A and phase B of the motor 1 are switched to either $V_1$ or $V_2$.

Voltages $V_1$ and $V_2$ are respectively applied to collectors of transistors 58A, 60A and 58B, 60B. The values of voltages $V_1$ and $V_2$ are chosen to be such that th voltages exciting motor driving circuits 10A and 10B are different and such that the detent torque is compensated for.

A driving device having the same configuration as that of the driving device of the fourth embodiment shown in FIG. 7 may be used in the sixth embodiment.

The present embodiment differs from the fifth embodiment shown in FIG. 9 in the above-described points. The other portions of the present embodiment are configured substantially in the same manner as the fifth embodiment.

Accordingly, as in the foregoing embodiments, the present embodiment has the configuration wherein the torque ripple is suppressed by individually controlling the exciting coils of a plurality of coils 2 and 3. As a result, the vibration and noise of the motor 1 can be effectively reduced by a driving device having a simple configuration, and it is possible to realize a high-performance motor.

As is apparent from the foregoing explanation, according to the present invention, a driving device for a brushless motor having a plurality of exciting coils includes a control means for individually controlling exciting torques of the respective exciting coils. Hence, it is possible to easily suppress a torque ripple by controlling the exciting torques of the plurality of coils, and to provide a driving device which can realize a high-performance brushless motor with little vibration and noise having a simple configuration.

The individual components represented by the blocks shown in FIGS. 1, 5 and 7 and the individual diodes, transistors, voltage sources, and AND gate circuits shown in FIGS. 6 and 8-10, are well known in the motor driving art and their specific construction and operation is not critical to the operation of the invention or the best mode for carrying out the invention. Moreover, the steps illustrated in FIGS. 3 and 4 can be easily programmed into well known central processing units by persons of ordinary skill, and since such programming per se is not part of this invention, no further description thereof is deemed necessary.

What is claimed is:

1. A motor driving device for driving a motor having a rotor and a plurality of excitation coils, said device comprising:
    detection means for detecting a rotation position of the rotor of the motor and for producing detection signals representing the rotation position;
    control means for performing closed-loop control of the switching timing for excitation currents applied to the excitation coils according to detection signals from said detection means; and
    a plurality of drive control means for controlling the current supplied to the excitation coils in accordance with an output from said control means, said plurality of drive control means comprising a plurality of pulse-width modulation signal generators for controlling current passing through the excitation coils, wherein said control means outputs a pulse-width modulation command signal to one of said plurality of said pulse-width modulation signal generators of such a value that the torque generated by one of the excitation coils, whose exciting current is controlled by said one of said plurality of drive control means, is substantially equal to the value of a detent torque of the motor.

2. The motor driving device according to claim 1, wherein one of said plurality of drive control means controls an excitation current applied to the excitation coil which increases the speed of the motor when said control means performs constant speed control of the motor.

3. A motor driving device for driving a motor having a rotor and a plurality of excitation coils, said device comprising;
    detection means for detecting a rotation position of the rotor of the motor and for producing detection signals representing the rotation position;
    control means for performing closed-loop control of the switching timing for excitation currents applied to the excitation coils according to detection signals from said detections means;
    a plurality of drive control means for controlling current supplied to the excitation coils in accordance with an output from said control means; and
    a pulse-width modulation signal generation circuit provided connecting said plurality of driving control means and said control means, for controlling the current passing through the excitation coils, wherein said control means outputs a pulse-width modulation command signal to said pulse-width modulation signal generation circuit of such a value that the torque generated by one of the excitation coils, whose exciting current is controlled by said one of said plurality of drive control means, is substantially equal to the value of a detent torque of the motor.

4. The motor driving device according to claim 2, wherein each of said plurality of drive control means comprises a resistor connected in series to an output terminal of its respective drive control means.

5. The motor driving device according to claim 4, wherein said plurality of drive control means output motor driving voltages different from one another.

6. The motor driving device according to claim 3, wherein said plurality of drive control means comprises means for compensating for a detent torque of the motor.

7. The motor driving device according to claim 3, wherein only one of said plurality of drive control means comprises a resistor connected in series with an output terminal of said one of said plurality of drive control means.

8. The motor driving device according to claim 3, wherein said plurality of drive control means comprises means for outputting different motor driving voltages to different ones of the excitation coils.

9. The motor driving device according to claim 8, wherein said pulse-width modulation generation circuit applies the same pulse-width modulation signal to said plurality of drive control means and wherein each of said plurality of drive control means comprises means for applying a voltage to an element thereof such that said plurality of dive control means output different motor driving voltages to different ones of the excitation coils.

10. The motor driving device according to claim 8, further comprising a plurality of means for applying voltages to elements of said plurality of drive control means and a plurality of switches for connecting said plurality of voltage applying means to said plurality of drive control means.

11. The motor driving device according to claim 3, wherein each of said plurality of drive control means comprises a esistor, adapted to be connected in series to an output terminal thereof, and a switch connecting and disconnecting said resistor to the output terminal.

* * * * *

UNITED STATES PATENT AND TRADEMARK OFFICE
CERTIFICATE OF CORRECTION

PATENT NO. : 5,150,030

DATED : September 22, 1992

INVENTOR(S) : NORIAKI ITO, ET AL.

It is certified that error appears in the above-identified patent and that said Letters Patent is hereby corrected as shown below:

COLUMN 1

Line 35, "disclosed" should read --disclose--.

COLUMN 2

Line 4, "U.S. Ser. No. 302,196 filed on Jan. 27, 1989," should read --U.S. Pat. No. 4,928,050,--.

Line 66, "Ser. No. 413,473 filed on Sep. 27, 1989," should read --Pat. No. 5,029,264,--.

COLUMN 4

Line 10, "assinged" should read --assigned--.

COLUMN 6

Line 12, "mans" should read --means--.

UNITED STATES PATENT AND TRADEMARK OFFICE
CERTIFICATE OF CORRECTION

PATENT NO. : 5,150,030
DATED : September 22, 1992
INVENTOR(S) : NORIAKI ITO, ET AL.

It is certified that error appears in the above-identified patent and that said Letters Patent is hereby corrected as shown below:

COLUMN 9

Line 20, "substna-" should read --substan---.

COLUMN 10

Line 57, "has" should read --is--.

COLUMN 11

Line 41, "transistors 58B, 60A," should read --transistors 58A, 60A,--.

COLUMN 12

Line 52, "th" should read --the--.

COLUMN 13

Line 63, "comprising;" should read --comprising--.

UNITED STATES PATENT AND TRADEMARK OFFICE
CERTIFICATE OF CORRECTION

PATENT NO. : 5,150,030
DATED : September 22, 1992
INVENTOR(S) : Noriaki Ito, et al It is certified that error appears in the above-indentified patent and that said Letters Patent is hereby corrected as shown below:

Column 14

Line 23, "2" should read --3--.

Line 60, "esistor" should read --resistor--.

Signed and Sealed this

Seventh Day of December, 1993

Attest:

BRUCE LEHMAN

Attesting Officer      Commissioner of Patents and Trademarks